Oct. 23, 1951 J. E. WALSTROM 2,572,226
WELDING OF THERMOPLASTIC MATERIALS WITH APPLICATION
OF HIGH-FREQUENCY DIELECTRIC ENERGY AND PRESSURE
Filed April 24, 1947
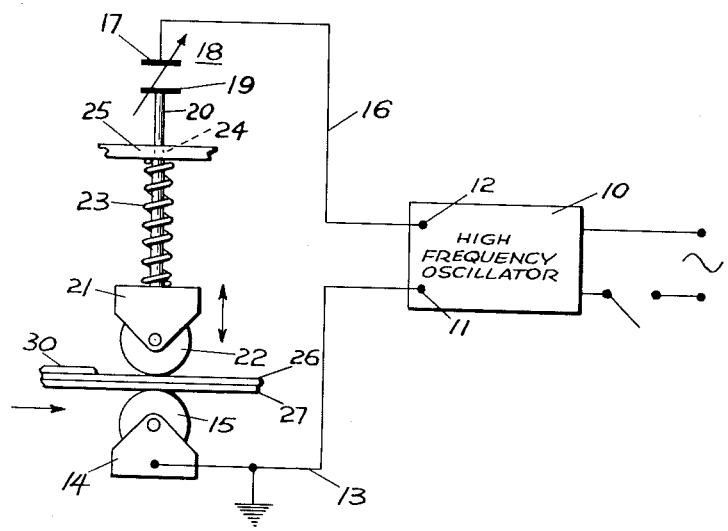
INVENTOR
JOHN E. WALSTROM
BY
ATTORNEY

UNITED STATES PATENT OFFICE 2,572,226

WELDING OF THERMOPLASTIC MATERIALS WITH APPLICATION OF HIGH-FREQUENCY DIELECTRIC ENERGY AND PRESSURE

John E. Walstrom, Diablo, Calif., assignor to Raytheon Manufacturing Company, Newton, Mass., a corporation of Delaware Application April 24, 1947, Serial No. 743,570

1 Claim. (Cl. 219—47)

This invention relates to improvements in apparatus for welding thermoplastic dielectric materials by the application of pressure together with heat generated in the dielectric materials upon passing a current of high frequency oscillating electric energy therethrough.

It is an object of this invention to provide improved dielectric heating apparatus of the type employing a pair of spring pressed electrodes between which multiple layers of dielectric thermoplastic materials may be passed to be welded together, the electrodes being connected to a source of high frequency oscillating electrical energy in a manner such that the variations in spacing between the electrodes, due to changes in number of layers or layer thickness of the thermoplastic materials, cause variations in the applied voltage to the electrodes such that a constant current through the dielectric material is maintained at all times for all thicknesses of materials to be welded and even heating is thus obtained.

Further objects and advantages of the invention will be apparent with reference to the following specification and single figure of the drawing in which the apparatus of the invention is diagrammatically shown.

A high frequency oscillator 10 having a suitable operating frequency and power output and being of any known design is provided for the purpose of applying high frequency oscillating energy to a dielectric material to be heated. The voltage output from the oscillator 10 appears across the output terminals 11 and 12. Output terminal 11 is connected by line 13 to the stationary grounded electrode frame member 14 in which is rotatably journalled a metal roller electrode 15. The other output terminal 12 of the oscillator 10 is connected by line 16 to the fixed plate or electrode 17 of a variable condenser 18 having air or other suitable dielectric therein. The movable plate or electrode 19 of the variable condenser 18 is fastened to one end of a shaft 20. The other end of the shaft 20 is fastened to a journal frame member 21 rotatably supporting the metal roller electrode 22. A compression spring 23 surrounds the shaft 20 which may be slidably journalled at 24 in a fixed machine frame member 25 and the compression spring normally urges the movable roller electrode 22 toward the fixed roller electrode 15 while resiliently resisting opposite movements of the roller electrode 22. The layers of dielectric thermoplastic material 26 and 27 to be welded may be passed between the spring pressed electrodes 15 and 22 in the direction of the arrow and it is apparent that the spring pressed roller electrode 22 will be operative to apply welding pressure to the thermoplastic layers 26 and 27.

Upon energizing the oscillator 10, high frequency oscillating energy of suitable voltage will be applied to the metal roller electrodes 15 and 22 to generate welding heat in the dielectric thermoplastic layers 26 and 27. The roller electrodes 15 and 22 and the dielectric material to be welded therebetween constitute, in effect, a condenser which is electrically connected in series with the variable condenser 18 across the output terminals 11 and 12 of the high frequency oscillator 10. Thus, a capacitive voltage divider comprising the variable condenser 18 and the condenser formed by the electrodes 15 and 22 with the work therebeween is provided and connected across the voltage output of the oscillator 10.

It will be understood that the movable electrode 22 will be moved in accordance with the thickness of the dielectric layers 26 and 27. In the case of a lap joint, including the additional layer 30 of material to be welded, the movable electrode 22 will be moved further away from the fixed electrode 15 and therefore the capacity of the condenser including the work to be welded will be reduced. For this reason, additional voltage of oscillating energy should be applied across the electrodes 15 and 22, if the current through the work is to be maintained constant and the heat be uniformly produced. This invention provides that the movable electrode 19 of the variable condenser 18 be moved closer to its fixed electrode 17 as the roller electrode 22 moves away from the roller electrode 15. Thus the distribution of voltages across the capacitive voltage divider is changed in view of the increased capacity of the condenser 18 relative to the reduced capacity of the condenser, including the work and metal roller electrodes 15 and 22, to thus apply a higher voltage of high frequency energy across the roller electrodes 15 and 22 and maintain the current through the work at relatively constant value regardless of changes in thickness of the work.

It has been found that, for best results, the average capacity of the variable condenser 18 should be approximately equal to the average capacity of the condenser including the dielectric work and roller electrodes 15 and 22. Also, for best results, assuring smoothness of regulation response, the dielectric material between the electrodes 17 and 19 of the variable capacitor 18 should be similar in dielectric strength to the dielectric materials being welded.

Various modifications of the invention, such as changes in the form and actuation of the variable condenser 18, will occur to those skilled in the art without departing from the spirit of the invention and the scope of the appended claim.

What is claimed is:

An apparatus for heating dielectric materials, comprising a pair of metal electrodes, means normally urging said electrodes together, the dielectric materials to be heated being passed between said electrodes, and a source of high frequency oscillatory energy, said electrodes being electrically connected in series with a variable condenser across the output of said source, said condenser having an average capacitance approximating the average capacitance across said electrodes with said dielectric material therebetween, said condenser having one electrode which is movable to vary the spacing between the two electrodes thereof, one of said metal electrodes being mechanically connected to said one condenser electrode to decrease the spacing between the electrodes of the condenser as the spacing between said metal electrodes increases.

JOHN E. WALSTROM.

REFERENCES CITED

The following references are of record in the file of this patent:

UNITED STATES PATENTS

| Number | Name | Date |
|---|---|---|
| 2,432,412 | Hacklander | Dec. 9, 1947 |
| 2,453,680 | Sweeny | Nov. 9, 1948 |
| 2,468,263 | Joy | Apr. 26, 1949 |
| 2,472,820 | Graham et al. | June 14, 1949 |
| 2,473,143 | Graham et al. | June 14, 1949 |
| 2,504,754 | Sweeny | Apr. 18, 1950 |
| 2,516,324 | Joy | July 25, 1950 |

FOREIGN PATENTS

| Number | Country | Date |
|---|---|---|
| 556,292 | Great Britain | Sept. 28, 1943 |

OTHER REFERENCES

Hoyler: An Electronic Sewing Machine, Electronics, August 1943, page 91.

Plastics, June 1944, pages 42–44, 46 and 89–91.

The Radio Amateur's Handbook, 1945 edition, page 29.